United States Patent
Saha et al.

(10) Patent No.: US 10,678,835 B2
(45) Date of Patent: Jun. 9, 2020

(54) GENERATION OF KNOWLEDGE GRAPH RESPONSIVE TO QUERY

(71) Applicant: International Business Machines Corporation, Armonk, NY (US)

(72) Inventors: Diptikalyan Saha, Bangalore (IN); Jaydeep Sen, Kolkata (IN); Sreyash Divakar Kenkre, Bangalore (IN); Karthik Sankaranarayanan, Bangalore (IN); Vinayaka Pandit, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 132 days.

(21) Appl. No.: 15/938,928

(22) Filed: Mar. 28, 2018

(65) Prior Publication Data
US 2019/0303498 A1    Oct. 3, 2019

(51) Int. Cl.
*G06F 16/36* (2019.01)
*G06N 5/02* (2006.01)
*G06F 16/33* (2019.01)

(52) U.S. Cl.
CPC ........ *G06F 16/367* (2019.01); *G06F 16/3344* (2019.01); *G06N 5/02* (2013.01)

(58) Field of Classification Search
CPC .................................................. G06F 16/367
USPC ............................................................ 704/9
See application file for complete search history.

(56) References Cited

U.S. PATENT DOCUMENTS

| | | | | |
|---|---|---|---|---|
| 10,169,336 B2* | 1/2019 | Mittal | ................. | G06F 17/2854 |
| 10,229,173 B1* | 3/2019 | MacGillivray | ....... | G06F 16/243 |
| 10,303,999 B2* | 5/2019 | Hertz | ..................... | G06Q 10/10 |
| 2005/0154690 A1* | 7/2005 | Nitta | ....................... | G06F 16/30 |
| | | | | 706/46 |
| 2016/0379120 A1 | 12/2016 | Merdivan et al. | | |
| 2017/0024375 A1 | 1/2017 | Hakkani-Tur et al. | | |
| 2018/0276273 A1* | 9/2018 | Mittal | ................... | G06F 16/243 |
| 2019/0228068 A1* | 7/2019 | Sen | ........................ | G06F 16/242 |

OTHER PUBLICATIONS

Prasojo, Radityo Eko et al., "Entity-Relationship Extraction from Wikipedia Unstructured Text", PhD Research and Study Plan, Apr. 13, 2016, 28 pages, Free University of Bozen-Bolzano.

(Continued)

*Primary Examiner* — Susan I McFadden
(74) *Attorney, Agent, or Firm* — Ference & Associates LLC

(57) ABSTRACT

One embodiment provides a method, including: receiving, from a user, a natural language query; generating an ontology subgraph by mapping the natural language query to a domain ontology and filtering the domain ontology based upon entities within the natural language query; producing a knowledge graph from (i) the generated ontology subgraph and (ii) a set of documents related to the natural language query, wherein the producing comprises extracting triples from the set of documents and aggregating the extracted triples to form the knowledge graph; and providing, to the user, a response to the received natural language query, wherein the returning the response comprises querying the produced knowledge graph using the natural language query.

20 Claims, 3 Drawing Sheets

(56) References Cited

OTHER PUBLICATIONS

Gawriljuk, Gleb et al., "A Scalable Approach to Incrementally Building Knowledge Graphs", TPDL 2016, 20th International Conference on Theory and Practice of Digital Libraries, 2016, 13 pages, Information Sciences Institute, USC Viterbi School of Engineering.

Duan, Weiwei, et al., "Building Knowledge Graph from Public Data for Predictive Analysis—A Case Study on Predicting Technology Future in Space and Time", SIGSPATIAL '16, Proceedings of the 24th ACM SIGSPATIAL International Conference on Advances in Geographic Information Systems, Oct. 31-Nov. 3, 2016, Burlingame, CA, USA, 7 pages, ACM Digital Library.

Choudhury, Sutanay et al., "NOUS: Construction and Querying of Dynamic Knowledge Graphs", Jun. 7, 2016, 4 pages, ACM Digital Library.

Pujara, Jay et al. "Building Dynamic Knowledge Graphs", NIPS Workshop on Automated Knowledge Base Construction, 2014, 6 pages, Carnegie Library of Pittsburgh Interlibrary Loan.

\* cited by examiner

GENERATION OF KNOWLEDGE GRAPH RESPONSIVE TO QUERY

BACKGROUND

When a person or user has a question or query, the person can access different sources for determining the answer. One source is a system where the user provides the query and the system returns the answer to the query, for example, a digital assistant, virtual assistant, or the like. These systems, and other systems that process user input including queries, generally have a natural language processing system or component that allows processing of a natural language input or query. Since the user generally provides the input as a natural language input (e.g., an input provided using ordinary language as opposed to artificial or computer language), the system generally converts the natural language input to a computer language that the computer can process. Using the converted input, the system can access one or more sources (e.g., training data, databases, information sources, etc.) to obtain a response to the input. The system then provides this response back to the user, sometimes in the form of a natural language response.

BRIEF SUMMARY

In summary, one aspect of the invention provides a method, comprising: receiving, from a user, a natural language query; generating an ontology subgraph by mapping the natural language query to a domain ontology and filtering the domain ontology based upon entities within the natural language query; producing a knowledge graph from (i) the generated ontology subgraph and (ii) a set of documents related to the natural language query, wherein the producing comprises extracting triples from the set of documents and aggregating the extracted triples to form the knowledge graph; and providing, to the user, a response to the received natural language query, wherein the returning the response comprises querying the produced knowledge graph using the natural language query.

Another aspect of the invention provides an apparatus, comprising: at least one processor; and a computer readable storage medium having computer readable program code embodied therewith and executable by the at least one processor, the computer readable program code comprising: computer readable program code configured to receive, from a user, a natural language query; computer readable program code configured to generate an ontology subgraph by mapping the natural language query to a domain ontology and filtering the domain ontology based upon entities within the natural language query; computer readable program code configured to produce a knowledge graph from (i) the generated ontology subgraph and (ii) a set of documents related to the natural language query, wherein the producing comprises extracting triples from the set of documents and aggregating the extracted triples to form the knowledge graph; and computer readable program code configured to provide, to the user, a response to the received natural language query, wherein the returning the response comprises querying the produced knowledge graph using the natural language query.

An additional aspect of the invention provides a computer program product, comprising: a computer readable storage medium having computer readable program code embodied therewith, the computer readable program code executable by a processor and comprising: computer readable program code configured to receive, from a user, a natural language query; computer readable program code configured to generate an ontology subgraph by mapping the natural language query to a domain ontology and filtering the domain ontology based upon entities within the natural language query; computer readable program code configured to produce a knowledge graph from (i) the generated ontology subgraph and (ii) a set of documents related to the natural language query, wherein the producing comprises extracting triples from the set of documents and aggregating the extracted triples to form the knowledge graph; and computer readable program code configured to provide, to the user, a response to the received natural language query, wherein the returning the response comprises querying the produced knowledge graph using the natural language query.

A further aspect of the invention provides a method, comprising: receiving a natural language query; and providing a response to the natural language query by querying a knowledge graph, the knowledge graph being produced for the received natural language query and being produced by: accessing a domain ontology related to the natural language query; creating a list of concepts and relations for a set of documents, wherein the set of documents comprises documents filtered from a document store to produce a set of documents that are related to the natural language query; generating, from the accessed domain ontology, an ontology fragment, wherein generating the ontology fragment comprises grouping a plurality of interpretation trees, each interpretation tree corresponding to a possible interpretation of the natural language query; and producing the knowledge graph using (i) the ontology fragment as a template for the knowledge graph and (ii) the created list of typed concepts.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
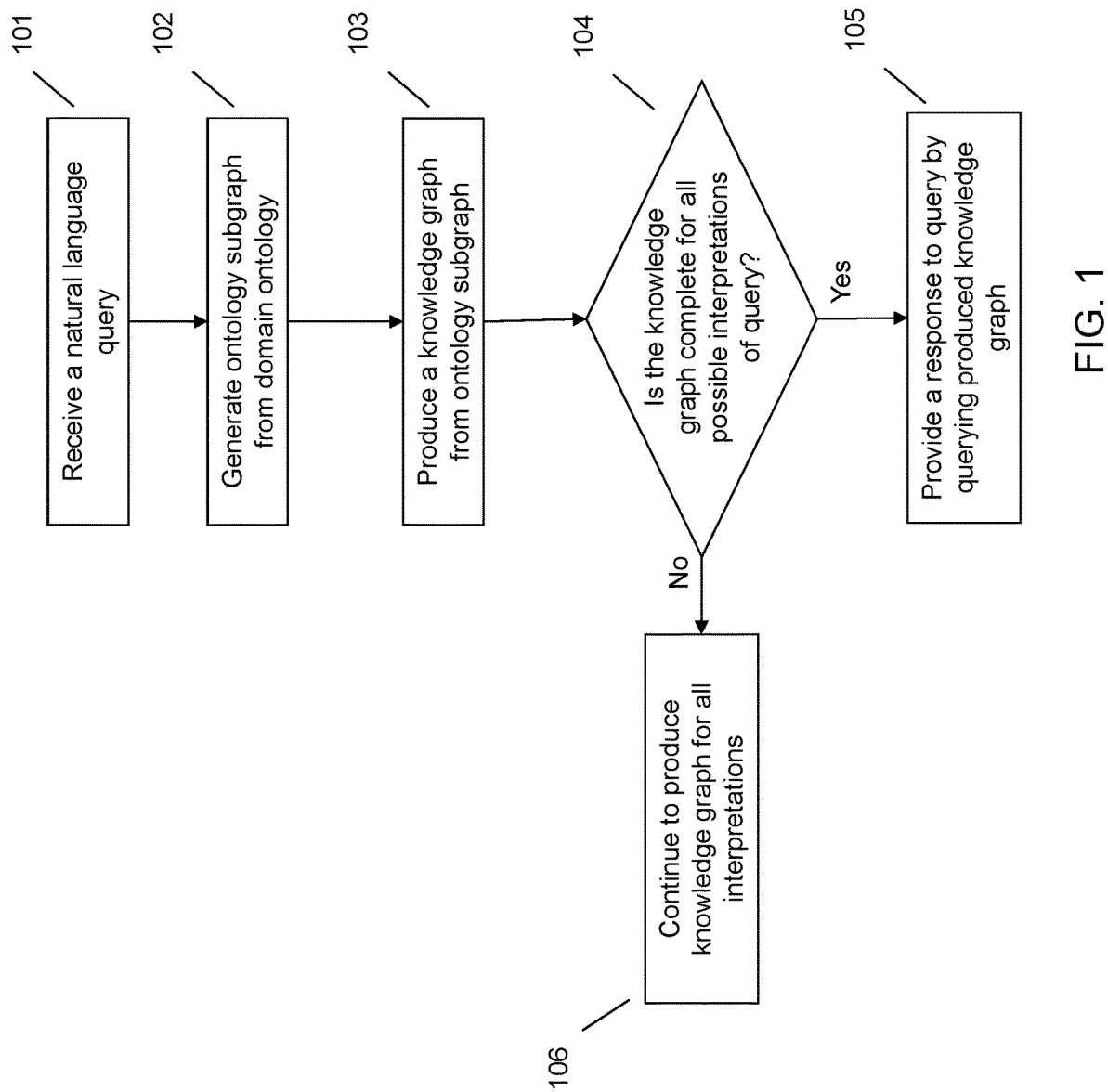
FIG. 1 illustrates a method of generating a knowledge graph that is responsive to a natural language query.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

A user may provide a query, for example, a factoid natural language query that is directed toward finding an answer, rather than performing a function or action, to a system that processes the natural language query to provide a response to the query. To obtain the response, the natural language query processing system processes the query, for example, by converting the query to a machine language, and then accesses one or more data sources to obtain the response to the query. The system generally has access to a plurality of document data stores, so finding the answer to the factoid natural language query may be time consuming if the system searched every single document or file within the data source. Thus, to reduce the amount of processing time required to find the response, traditional systems usually do not actually search every single document or file within the data source. In other words, the systems do not search every word within every document or file to find the response. Rather, the system usually has an algorithm that is used for searching that reduces the amount of time it takes to find the response.

One searching technique used by these systems is a technique that only searches the index of the document stores. In other words, rather than searching every document in the document store, the system only searches in the index that is associated with the document. The problem with this technique is that the precise answer to the question may not be found. In other words, because the system is only searching the index, the index may not include the precise answer to the query. Rather, the index may only provide related information that may or may not, and is generally not, a complete response to the query.

Another searching technique includes using knowledge graphs. Knowledges graphs are generated for the data sources. These knowledge graphs include nodes that correspond to an entity and edges that connect the entities and identify the relationships between the connected entities. For example, one node may be "Moon", another node may be "Earth", and the connecting edge may identify the relationship as "Revolves Around" with an arrow indicating that the moon revolves around the Earth. When the system receives a query, the system then searches the knowledge graphs for the answer. The knowledge graphs are generated either at the time of creation of the document store, after the document store has been updated, or at a different time before receipt of the query. This introduces multiple problems.

One problem with this approach is that the knowledge graphs have to be stored with the data store. Since the knowledge graphs require data storage space, the storage of the knowledge graphs take up data storage space that could be used for something else, particularly if the knowledge graph is never used. Another problem with this approach is that the generation of knowledge graphs is very time-consuming and processing resource intensive and many of these knowledge graphs will never be used, thereby wasting time and processing resources. Additionally, because generation of the knowledge graphs is time-consuming, the knowledge graphs are not continually updated. Therefore, if the documents within the data store are updated, for example, facts change, new information is introduced, or the like, the knowledge graph may not be updated at the same time. Thus, the knowledge graph may not contain the most up-to-date information and may then return an incorrect, inaccurate, or incomplete response to the query. Another problem with generation of the knowledge graphs before receipt of a query is that the knowledge graph does not take into account the query that is being asked. Thus, the system may search a knowledge graph that is related to an interpretation of the query that is not actually the intended query of the user, thereby resulting in an inaccurate response to the query.

Accordingly, the techniques and systems as described herein provide a system and technique for providing a response to a received input or query by generating a knowledge graph in response to receipt of the query. Thus, the generated knowledge graph is produced while taking into account the query and is, therefore, a knowledge graph directed towards the query. The system receives a natural language query from a user. Upon receipt of the natural language query the system uses a natural language processing system to analyze and process the natural language query. In processing the natural language query, the system accesses one or more domain ontologies that are related to the query. The system may also access or use a translation index that can provide a mapping between entities within the query and the ontology and/or a listing of synonyms that may be associated with ontology elements.

Using the ontology and other inputs, the system generates an ontology subgraph that is a filtered form of the domain ontology that is based upon the entities included in the input or query. In other words, as the natural language processing system is processing the input, the system identifies entities within the query and filters the domain ontology to identify a subset of the ontology that is related to the query. From the ontology subgraph, the system produces a knowledge graph. To produce the knowledge graph the system also uses a set of documents that have been identified within the data store as being related to the query. In other words, the set of documents are documents that are relevant to the query. Once the knowledge graph has been produced, the system can query the knowledge graph using the query to return an accurate and complete response to the query.

Such a system provides a technical improvement over current systems for responding to queries provided by users. Rather than searching only an index or other catalogue associated with a data store to find a response, the system as described herein searches a knowledge graph, thereby providing a more precise response to the query that cannot be provided by merely searching the index of the data store. Additionally, as opposed to traditional systems that search knowledge graphs, the systems and methods as described herein generate a knowledge graph in response to receiving a query and use that knowledge graph to produce a response to the query. Thus, the knowledge graph that is searched is directed to the received query, thereby resulting in a response that is more complete and accurate with respect to the received query. Additionally, because the knowledge graph is generated upon receipt of the query, the systems and methods as described herein do not suffer from the problem that the knowledge graph contains outdated, incorrect, or incomplete information as found in conventional techniques. Thus, the systems and methods described herein provide a technique that allows for returning a response that does not require time-consuming searches of every document or file within a data store and a response that is accurate and complete with respect to the received response, thereby resulting in an improvement to conventional systems that do not provide such benefits.

FIG. 1 illustrates a method for providing a response to a query by querying a knowledge graph that is generated responsive to receipt of the query. In other words, FIG. 1 illustrates a method for generating an on-demand knowledge graph that takes into account the query, thereby obtaining a response that is accurate and complete with respect to the query and the intent of the user when providing the query. At 101 the system receives a natural language query from a user. A natural language query includes a query that is provided in an ordinary human language, for example, as if the user were talking to another person. The term query will be used throughout. However, it should be understood that a query may include any type of input that requests a response from a system receiving the input. In other words, a query may include a request, demand, question, or other type of input that elicits a response from the receiving system. The natural language query may be provided in any form, for example, as audible input, text input, haptic input, gesture input, or the like.

To process the natural language query the system may use a natural language processing system. The natural language processing system analyzes the natural language input to convert the natural language input to a machine language that is able to be processed by the system. To make this conversion the natural language process system may access a domain ontology. The domain ontology may be an ontology that is relevant to an overarching domain of the query. For example, if the query is directed to a query within the business domain, the domain ontology may include a business ontology. As another example, if the query is directed to a query within the legal domain, the domain ontology may include a legal ontology. The system may also access one or more other sources to assist in processing the natural language query. For example, the system may access a translation index that identifies a mapping between entities or data values or their variations in the query and ontology elements included in the domain ontology. As another example, the system may access a listing of synonyms associated with the ontology elements that identify different words that may be used in place of a particular word within the domain ontology.

The system may then generate an ontology subgraph at 102. The ontology subgraph may also be referred to as an ontology fragment and may include a subset of the domain ontology. Generation of the ontology subgraph may include mapping the natural language query to the domain ontology and filtering the domain ontology to an ontology subset based upon entities included within the natural language query. To generate the ontology subgraph the system maps the query to an interpretation tree. To use an interpretation tree, the system starts at a root node corresponding to an entity included in the query and then traverses the tree based upon the query until it reaches a leaf node that corresponds to a particular response or interpretation.

When the natural language processing system attempts to convert the natural language query to machine language, the system may identify or determine that more than one interpretation of the query may be possible. For example, if a user provides the query "How much is a bus ticket to Lincoln?" the system may identify that there are multiple cities having the name "Lincoln". Thus, the query includes multiple different interpretations that would likely result in different responses. When the system is traversing an interpretation tree and determines that more than one branch could be accessed and still fulfill the query, the system determines that an ambiguity exists and, therefore, more than one interpretation is possible. Therefore, generating the ontology subgraph may include identifying more than one interpretation tree or branch of an interpretation tree, each tree or branch corresponding to a different possible interpretation of the query. When generating the ontology subgraph, the system may then unionize, aggregate, or combine the plurality of interpretation trees into a single ontology subgraph. This unionized ontology subgraph ensures that all relevant information which can be used to respond to the query is retrieved all at once, thereby ensuring completeness of the knowledge graph.

From the ontology fragment or ontology subgraph, the system may produce a knowledge graph at 103. A set of documents are also used when producing the knowledge subgraph. The documents include documents that are relevant to the natural language query. To identify these documents the system may use conventional techniques to filter the documents included in the data store to determine which documents are relevant to the natural language query and may then return this set of documents to the system for use in creating the knowledge graph.

The system may then use a triple extractor to extract concepts and relations or relationships from the document set. A triple is a data structure that includes two entities and the relationship between the entities, for example, <Moon, revolves around, Earth>, and the like. Since the number of documents is small, because the extractor is only used on the relevant documents, the extractor may make multiple passes over the documents for higher precision. Additionally, the algorithms for the extractors may be more complex than in traditional techniques, again because the document set is small. Additionally, more advanced natural language processing techniques, for example, dependency parsing, natural language recognition, or the like, may be used to get features for the extractor.

The triple extractor may include a trained triple extractor which has a list of relations along with types, concepts, or entities of its arguments. The translation index and synonym list may be used for disambiguation and canonicalization of entities and relations extracted by or before extraction by the extractor. A set of surface forms for a relation predicate are provided, where multiple relation predicates may have the same surface form. Using a Named-Entity Recognition (NER) subtask of an information extraction program, the system can extract entities and their types from a document. The extracted entities and predicate surface forms can then be used to form possible triples.

Since the ontology subgraph also consists of entities and relations between the entities, the system can weight the possible triples in favor of triples having entities and relations that match with the ontology subgraph, thereby selecting triples that are relevant to the query. For example, in disambiguating the triples or while weighting these triples, the system may make the disambiguation or weighting in favor of concepts that are included in the ontology subgraph. The system can then output the weighted triples as a list of typed concepts and relationships between the concepts. This list of typed concepts and relations or relationships is also used to produce the knowledge graph at 103. The list of typed concepts and relations can be used to form a weighted graph that can then be used to produce a knowledge subgraph that has close alignment to the ontology subgraph or fragment with respect to the entities and relations included in both graphs. Since the number of triples is small because the set of documents that were retrieved is a reduced set that is relevant to the query, advanced combinatorial optimization techniques can be used to align the produced knowledge graph with the ontology fragment.

The produced knowledge graph may include a plurality of nodes, where each node represents a topic or concept. The nodes may also represent sub-topics or sub-concepts. For example, the knowledge graph may include a plurality of graphs, where each graph represents a single topic. The nodes of this graph then represent sub-topics found within that topic. The nodes within the graph may be connected by edges that represent relationships between the nodes. For example, an edge may represent that one node belongs to another node. As another example, an edge may represent that one node is similar to another node. As a final example, an edge may represent a particular relationship that one node has with another node.

At 104 the system may ensure that the produced knowledge graph is complete for all possible interpretations of the query, which may be just a single interpretation or multiple interpretations. If the knowledge graph is not complete at 104, the system may continue to produce, including updating, the knowledge graph at 106 until all interpretations, or at least all relevant interpretations, are included in the knowledge graph.

If, however, the knowledge graph is complete at 104, the system may provide a response to the query to a user at 105. Providing the response may include providing a natural language response. In other words, the system may convert the machine language response to a natural language response using a natural language generator. In providing the response, the system may query the produced knowledge graph using the natural language query. Using the natural language query may include using a query that is associated with the natural language query, for example, the machine language query produced from the natural language query. Querying the produced knowledge graph may include executing the query over the knowledge graph. In other words, the system may traverse the knowledge graph using entities and relations identified from the query to reach a node having a response to the query. If the produced knowledge graph includes more than one interpretation for the query, the system may provide more than one response, each one being applicable to a different interpretation. Provision of each response may include executing a query applicable to each interpretation over the knowledge graph.

Figure 2:
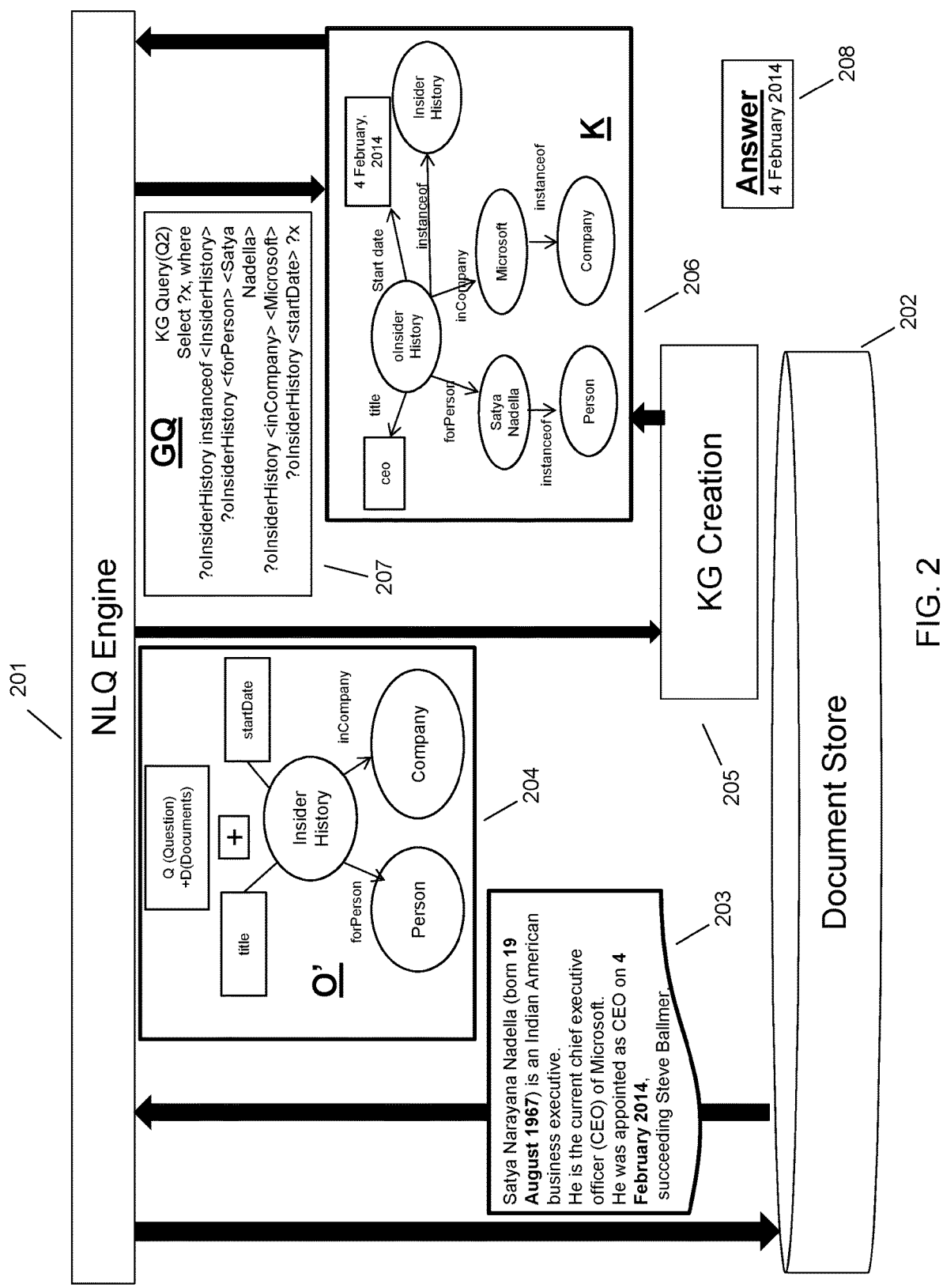
FIG. 2 illustrates an example creation of a knowledge graph at the time of receipt of a natural language query.

FIG. 2 illustrates an overall example of the system for providing a response to a natural language query by generating an on-demand knowledge graph that is relevant to the query. For simplicity, the example of FIG. 2 only assumes that a single interpretation is possible for the query. However, it should be understood that more than one interpretation may be possible for each query and the system may provide a response for each possible interpretation of the query. Additionally, the produced knowledge graph may include the information for each interpretation.

For purposes of this example, the query is "When did Satya Nadella become the CEO of MICROSOFT?" A natural language query (NLQ) engine 201 receives the natural language query and attempts to process the query and convert it to machine or computer language. The system also accesses a document store 202 that contains all documents and finds or produces a set of documents 203 that are relevant to the query. For example, the system may simply perform a search of the document store using entities included in the received query. The system generates an ontology subgraph 204 that is a subset of a domain ontology (not shown). The set of documents 203 and ontology subgraph 204 are passed to the knowledge graph creation system 205. As discussed above, other inputs may also be passed to the knowledge graph creation system 205, for example, a translation index, synonym listing, and/or the like. The knowledge graph creation system 205 then generates a knowledge graph 206 that is relevant to the received query. The system then executes the query (converted to machine language in FIG. 2) 207 over the produced knowledge graph 206. Executing the query 207 over the produced knowledge graph 206 results in the return of an answer or response 208 of 4 Feb. 2014. MICROSOFT is a registered trademark of Microsoft Corporation in the United States and other countries.

Thus, the systems and methods as described herein provide a method of generating an on-demand knowledge graph that is relevant to the received query. Such a system eliminates the inaccuracies and incompleteness that occur with responses provided by systems that merely search document indexes. Accordingly, the user is provided an answer that is complete, accurate, up-to-date, and relevant to the provided query. Additionally, the provider of the system does not have to spend time and resources to create knowledge graphs for documents stores, where the knowledge graphs not only use data storage space, but may also never be used, as found in systems that generate knowledge graphs offline.

Figure 3:
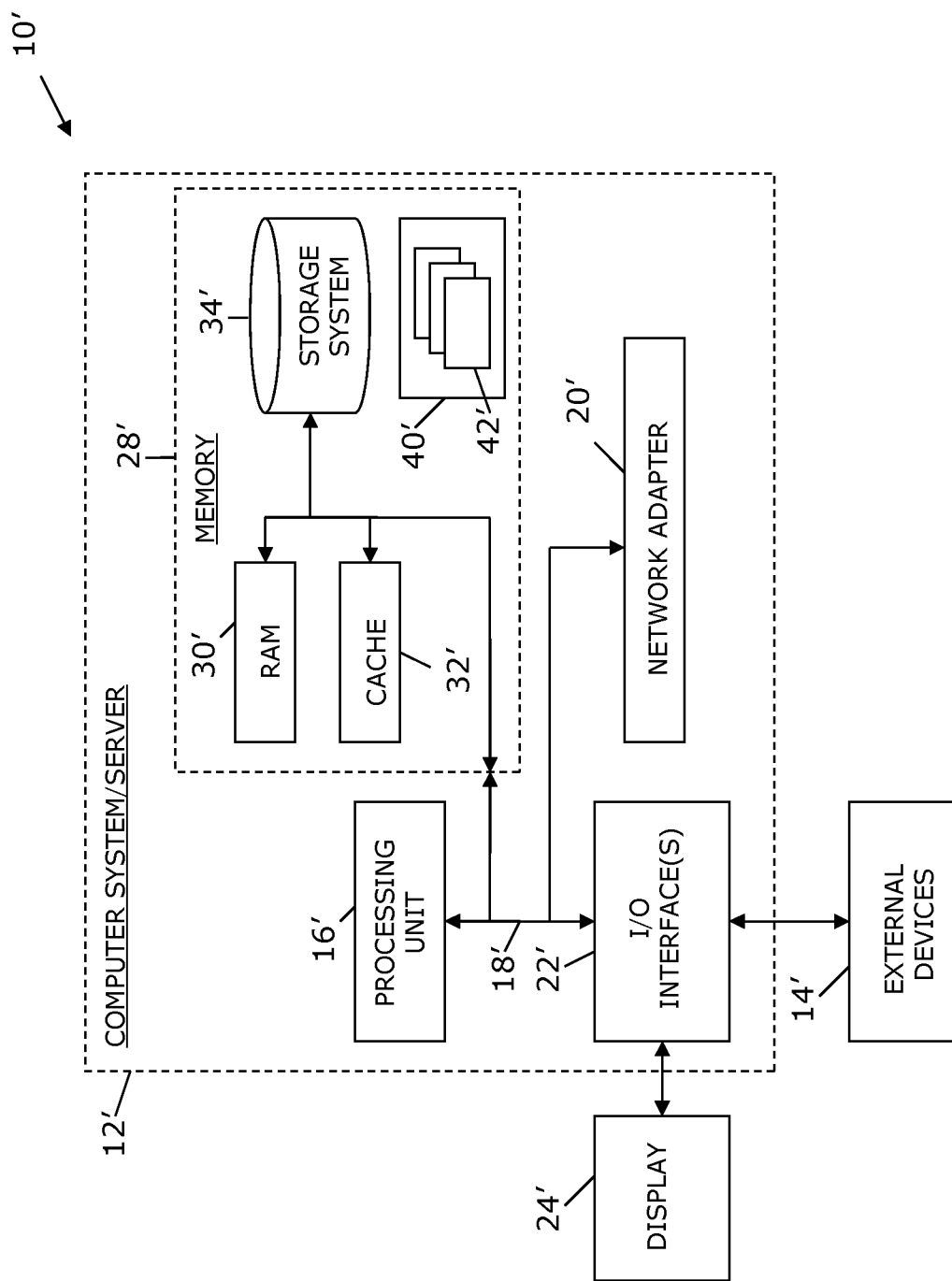
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
  receiving, from a user, a natural language query;
  generating, responsive to receiving the natural language query, an ontology subgraph by mapping the natural language query to a domain ontology and identifying a subset of the domain ontology related to the natural language query by filtering the domain ontology based upon entities included within the natural language query;
  producing, responsive to receiving the natural language query, a knowledge graph from (i) the generated ontology subgraph and (ii) a set of documents related to the natural language query, wherein the producing comprises extracting triples from the set of documents and aggregating the extracted triples to form the knowledge graph; and
  providing, to the user, a response to the received natural language query, wherein the returning the response comprises querying the produced knowledge graph using the natural language query.

2. The method of claim 1, comprising identifying a plurality of interpretations for the natural language query.

3. The method of claim 2, wherein each of the plurality of interpretations has a corresponding interpretation tree and wherein the generating an ontology subgraph comprises aggregating the plurality of interpretation trees.

4. The method of claim 2, comprising disambiguating the plurality of interpretations based upon entities included within the received natural language query.

5. The method of claim 2, wherein the providing a response comprises providing a response for each of the identified plurality of interpretations.

6. The method of claim 1, wherein the extracted triples comprise a list of typed concepts and relations.

7. The method of claim 1, wherein the producing a knowledge graph comprises aggregating the extracted triples into a knowledge graph structure that aligns with the generated ontology subgraph.

8. The method of claim 1, wherein the extracting triples comprises using a plurality of trained extractors to identify (i) entities within the set of documents and (ii) relations between the entities within the set of documents.

9. The method of claim 1, wherein the producing a knowledge graph comprises using a translation index that provides a mapping between entities within the natural language query and variations of those entities within the domain ontology.

10. The method of claim 1, wherein the producing a knowledge graph comprises identifying synonyms of entities included in the natural language query within the domain ontology.

11. An apparatus, comprising:
  at least one processor; and a computer readable storage medium having computer readable program code embodied therewith and executable by the at least one processor, the computer readable program code comprising:

computer readable program code configured to receive, from a user, a natural language query;

computer readable program code configured to generate, responsive to receiving the natural language query, an ontology subgraph by mapping the natural language query to a domain ontology and identifying a subset of the domain ontology related to the natural language query by filtering the domain ontology based upon entities included within the natural language query;

computer readable program code configured to produce, responsive to receiving the natural language query, a knowledge graph from (i) the generated ontology subgraph and (ii) a set of documents related to the natural language query, wherein the producing comprises extracting triples from the set of documents and aggregating the extracted triples to form the knowledge graph; and computer readable program code configured to provide, to the user, a response to the received natural language query, wherein the returning the response comprises querying the produced knowledge graph using the natural language query.

12. A computer program product, comprising:

a computer readable storage medium having computer readable program code embodied therewith, the computer readable program code executable by a processor and comprising:

computer readable program code configured to receive, from a user, a natural language query;

computer readable program code configured to generate, responsive to receiving the natural language query, an ontology subgraph by mapping the natural language query to a domain ontology and identifying a subset of the domain ontology related to the natural language query by filtering the domain ontology based upon entities included within the natural language query;

computer readable program code configured to produce, responsive to receiving the natural language query, a knowledge graph from (i) the generated ontology subgraph and (ii) a set of documents related to the natural language query, wherein the producing comprises extracting triples from the set of documents and aggregating the extracted triples to form the knowledge graph; and computer readable program code configured to provide, to the user, a response to the received natural language query, wherein the returning the response comprises querying the produced knowledge graph using the natural language query.

13. The computer program product of claim 12, comprising identifying a plurality of interpretations for the natural language query and wherein the providing a response comprises providing a response for each of the identified plurality of interpretations.

14. The computer program product of claim 13, wherein each of the plurality of interpretations has a corresponding interpretation tree and wherein the generating an ontology subgraph comprises aggregating the plurality of interpretation trees.

15. The computer program product of claim 13, comprising disambiguating the plurality of interpretations based upon entities included within the received natural language query.

16. The computer program product of claim 12, wherein the extracted triples comprise a list of typed concepts and relations.

17. The computer program product of claim 12, wherein the producing a knowledge graph comprises aggregating the extracted triples into a knowledge graph structure that aligns with the generated ontology subgraph.

18. The computer program product of claim 12, wherein the extracting triples comprises using a plurality of trained extractors to identify (i) entities within the set of documents and (ii) relations between the entities within the set of documents.

19. The computer program product of claim 12, wherein the producing a knowledge graph comprises using a translation index that provides a mapping between entities within the natural language query and variations of those entities within the domain ontology.

20. A method, comprising:

receiving a natural language query; and providing a response to the natural language query by querying a knowledge graph, the knowledge graph being produced for the received natural language query and after receipt of the natural language query and being produced by:

accessing a domain ontology related to the natural language query;

creating a list of concepts and relations for a set of documents, wherein the set of documents comprises documents filtered from a document store within the domain ontology to produce a set of documents that are related to the natural language query;

generating, from the accessed domain ontology, an ontology fragment, wherein generating the ontology fragment comprises grouping a plurality of interpretation trees, each interpretation tree corresponding to a possible interpretation of the natural language query; and producing, after receipt of the natural language query, the knowledge graph using (i) the ontology fragment as a template for the knowledge graph and (ii) the created list of typed concepts.

* * * * *